United States Patent
Soga et al.

(10) Patent No.: US 7,929,254 B2
(45) Date of Patent: Apr. 19, 2011

(54) DISK DRIVE DEVICE AND CARRIAGE OF ACTUATOR WITH DAMPING MEMBER

(75) Inventors: Eiji Soga, Kanagawa (JP); Masakazu Sasaki, Kanagawa (JP); Hajime Eguchi, Kanagawa (JP); Hiromitsu Masuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 727 days.

(21) Appl. No.: 11/998,604

(22) Filed: Nov. 30, 2007

(65) Prior Publication Data
US 2008/0151433 A1 Jun. 26, 2008

(30) Foreign Application Priority Data

Dec. 25, 2006 (JP) .................. 2006-348673

(51) Int. Cl.
*G11B 5/48* (2006.01)
*G11B 21/21* (2006.01)
(52) U.S. Cl. ...................... 360/266; 360/244.3
(58) Field of Classification Search .............. 360/266, 360/244.3
See application file for complete search history.

(56) References Cited

U.S. PATENT DOCUMENTS

| | | | | |
|---|---|---|---|---|
| 4,819,094 A | * | 4/1989 | Oberg | 360/245.9 |
| 5,187,625 A | * | 2/1993 | Blaeser et al. | 360/244.3 |
| 5,214,549 A | * | 5/1993 | Baker et al. | 360/97.02 |
| 5,801,905 A | * | 9/1998 | Schirle et al. | 360/265.9 |
| 5,936,808 A | * | 8/1999 | Huang et al. | 360/265.9 |
| 5,949,617 A | * | 9/1999 | Zhu | 360/244.8 |
| 6,212,043 B1 | * | 4/2001 | Nakamura et al. | 360/244.3 |
| 6,215,623 B1 | * | 4/2001 | Zhu | 360/244.3 |
| 6,297,933 B1 | * | 10/2001 | Khan et al. | 360/244.2 |
| 6,359,755 B1 | * | 3/2002 | Dietzel et al. | 360/244.3 |
| 6,731,466 B2 | * | 5/2004 | Arya | 360/244.3 |
| 6,735,050 B2 | * | 5/2004 | Takagi et al. | 360/244.9 |
| 6,751,062 B2 | | 6/2004 | Kasajima et al. | |
| 6,947,260 B2 | * | 9/2005 | Dominguez et al. | 360/265 |
| 7,304,823 B2 | * | 12/2007 | Suzuki | 360/244.3 |
| 7,576,955 B1 | * | 8/2009 | Yang et al. | 360/266 |
| 7,697,240 B2 | * | 4/2010 | Funabashi et al. | 360/265.9 |
| 7,697,241 B2 | * | 4/2010 | Pottebaum et al. | 360/266 |

FOREIGN PATENT DOCUMENTS

JP  2003-022631 A  1/2003

* cited by examiner

*Primary Examiner* — Brian E Miller
(74) *Attorney, Agent, or Firm* — Mahmedi Paradice Kreisman LLP; Christopher J. Brokaw

(57) ABSTRACT

Embodiments of the present invention help to suppress performance degradation in an actuator of a disk drive device when attaching a damping member to a single surface of an arm. According to one embodiment, in a HDD a damping member is attached to a single surface of an arm. A shape of an inner arm is asymmetric with the center position between disks. Specifically, the thickness from a center position between the disks to the damping material attaching surface is thinner than the thickness from a center position between the disks to an opposite surface of the damping member attaching surface. This suppresses deformation of the vibration mode in the case that the damping member is attached to the single surface of the arm.

8 Claims, 10 Drawing Sheets

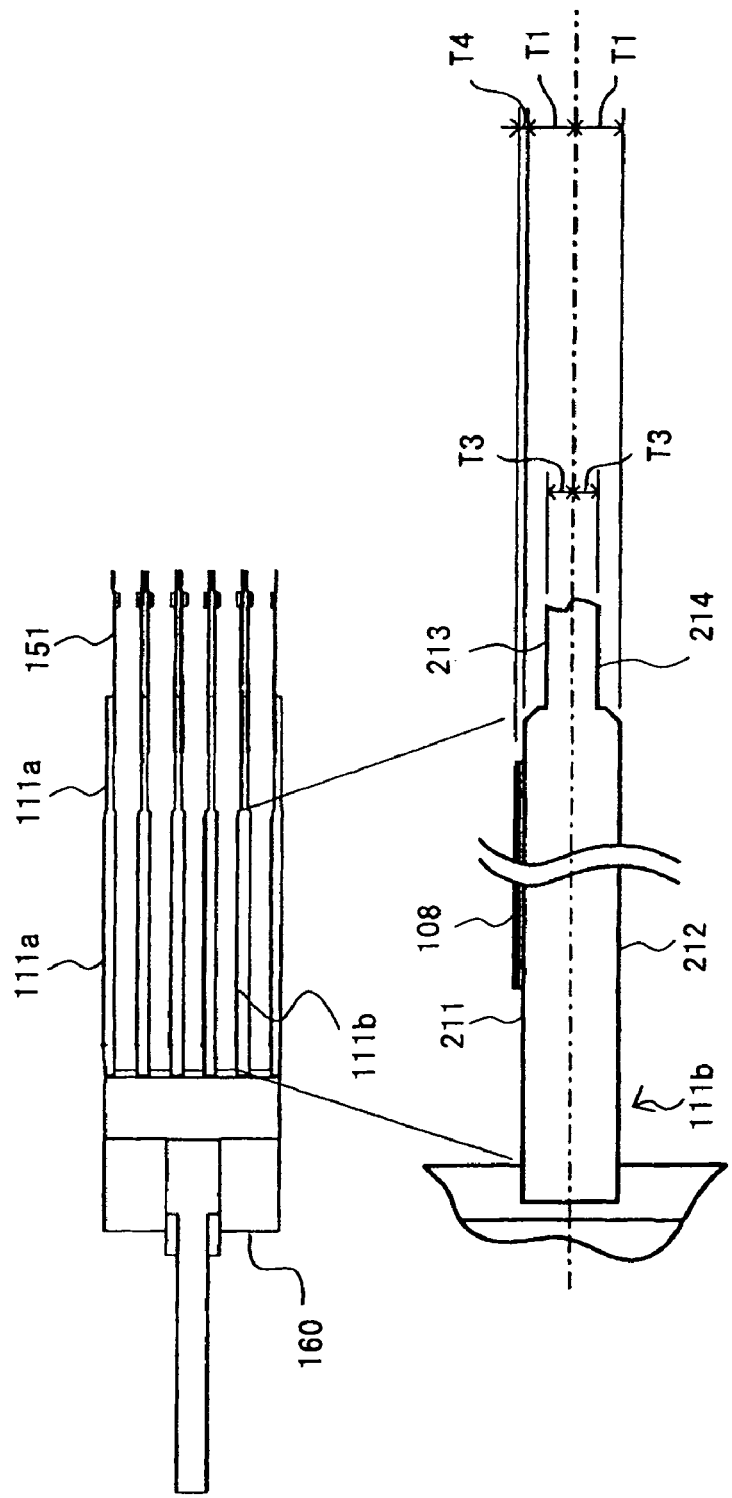

DISK DRIVE DEVICE AND CARRIAGE OF ACTUATOR WITH DAMPING MEMBER

CROSS-REFERENCE TO RELATED APPLICATION

The instant nonprovisional patent application claims priority to Japanese Patent Application No. 2006-348673 filed Dec. 25, 2006 and which is incorporated by reference in its entirety herein for all purposes.

BACKGROUND OF THE INVENTION

A hard disk drive (hereinafter referred to as HDD) in recent years rotates a magnetic disk and drives a head stack assembly (hereinafter referred to as HSA) at high speed in response to the request for high capacity and high recording density, additionally high-speed accessing. As schematically illustrated in a side view of FIG. 8(a), the HSA includes a carriage 160 and head gimbal assemblies (hereinafter referred to as HGAs) 151 and pivots around a pivotal axis.

The HGA 151 is an assembly of a suspension and a head slider. Typically, the HSA has a plurality of arms 111. In FIG. 8, a top end arm 111a and one of the inner arms 111b are exemplarily designated with reference numerals. An inner arm is provided between two magnetic disks and two HGAs corresponding to the respective magnetic disks are attached to it. Each of the HGAs are attached to the top and bottom end arms.

With finer track pitch for high-capacity and high recording density and speed-up of driving, required conditions for vibration of the HSA has become severer. To this end, several ways to suppress vibration of the HSA at driving have been suggested. In one of those ways, a dumping member is attached to the carriage of the HSA to suppress sympathetic vibration of the carriage (for example, refer to Japanese Patent Publication No. 2003-022631 "Patent Document 1"). Covering a part of the arm with the dumping member suppresses the vibration of the arm and improves accuracy of head positioning.

Thus, to damp the vibration of the HSA, especially the vibration of the arm, it is effective that the dumping member is adhered to the arm. FIG. 8(b) is a side view schematically showing a partial configuration of the inner arm 111b to which the damping member 108 is attached. As shown in FIG. 8(b), the damping member 108 is preferably to be adhered to a single surface of the arm 111b in order to limit increase in cost and mass of the arm 111b. The damping member is attached to a single surface of each arm shown in FIG. 8(a).

The upper HGA is attached to an HGA attaching surface 213 and the lower HGA is attached to an attaching surface 214. The damping member 108 is attached to a damping member attaching surface 211. The shape of the inner arm 111b is symmetric about the center between the magnetic disks (HGAs) as illustrated in FIG. 8(b). The measurements (thicknesses) from the center line to the upper and lower HGA attaching surfaces 213 and 214 are the same and denoted by T3. Similarly, the measurement (thickness) from the center line to the damping member attaching surface 211 and the measurement (thickness) from the opposite surface 212 of the damping member attaching surface 211 to the center line are the same and denoted by T1. The thickness of the damping member 108 is denoted by T4.

In order to confirm the damping effect in the arm before and after the damping member is adhered, frequency responses are obtained by a numerical analysis simulation. FIG. 9(a) shows amplitude of the head slider in the off-track direction in the case that a periodic exciting force in the in-plane direction is applied to a tip end of the inner arm without the damping member attached. FIG. 9(b) shows the amplitude of the head slider in the off-track direction in the case that the same input is applied to the tip end of the inner arm with the damping member attached.

FIG. 10(a) shows the amplitude of the head slider in the off-track direction in the case that a torsion moment about the longitudinal direction of the arm as the axis is applied to the tip end of the inner arm without the damping member adhered. FIG. 10(b) shows the amplitude of the head slider in the off-track direction in the case that the same input is applied to the tip end of the inner arm with the damping member adhered.

During vibration of the arm (head slider), there is a sway mode in which the arm vibrates in the in-plane direction of the magnetic disk and a torsion mode in which the arm vibrates like twisting, other than a bending mode in which the arm vibrates in the normal direction of the magnetic disk. The solid line represents the vibration of the upper head slider and the dotted line represents the vibration of the lower head slider. With regard to the outputs, the peak value of the output before the damping member is adhered has been set to coincide with the actual measured value.

As shown in FIGS. 9(a) and 9(b), the vibration in the sway mode is much reduced with respect to the arm to which the damping member is adhered. On the other hand, as shown in FIGS. 10(a) and 10(b), when the torsion moment is applied, the vibration changes significantly by adhering the damping member. Specifically, in the sway mode, the vibration is excited only by an exciting force in the in-plane direction before the damping member is adhered as shown in FIGS. 9(a) and 10(a). However, after the damping member is adhered, a peak in the sway mode also appears in response to the torsion moment.

Also, as shown in FIG. 9(a), the peak values in the torsion mode of the upper and the lower head sliders coincide with each other before the damping member is adhered. However, after the damping member is adhered, a big difference appears in the peak values in the torsion mode between the upper and the lower head sliders.

These changes of the vibration are considered to be caused by the change of the mode configuration by the damping member adhered on a single surface of the arm. Adhering the damping member results in addition of mass and stiffness. This results in the change of the mode configuration of the arm. For example, the sway mode is accompanied by torsion in the mode configuration, and as shown in FIG. 10(b), an in-plane vibration (sway mode) is excited in response to the torsion excited force. In the torsion mode, there arises a difference between the amplitude of the upper and the lower head sliders so that the amplitude of one of the head sliders may not be reduced. Such vibration change disturbs accurate head positioning to result in preventing proper reading/writing processes.

In another aspect, adhering the damping member to a single surface of the inner arm results in that the clearances between the top or the bottom surface of the arm and the magnetic disk thereover or thereunder respectively are different. That is, the clearance between the surface of the damping member and the surface of the magnetic disk is smaller than the clearance of the opposite surface by the thickness of the damping member. Hence, the shock resistant performance of the HDD is considered to be degraded by the thickness of the damping member.

BRIEF SUMMARY OF THE INVENTION

Embodiments in accordance with the present invention suppress performance degradation in an actuator of a disk drive device when attaching a damping member to a single surface of an arm. According to the particular embodiment of FIG. 3, in a HDD 1, a damping member 108 is attached to a single surface of an arm 111. Besides, a shape of an inner arm 111b is asymmetric with the center position between disks. Specifically, the thickness from a center position between the disks to the damping material attaching surface 211 is thinner than the thickness from a center position between the disks to an opposite surface 212 of the damping member attaching surface 211. This suppresses deformation of the vibration mode in the case that the damping member 108 is attached to the single surface of the arm 111b.

BRIEF DESCRIPTION OF THE DRAWINGS

FIGS. 8(a) and 8(b) are diagrams schematically showing the configurations of the actuator and the arm according to a conventional technique.

DETAILED DESCRIPTION OF THE INVENTION

Figure 1:
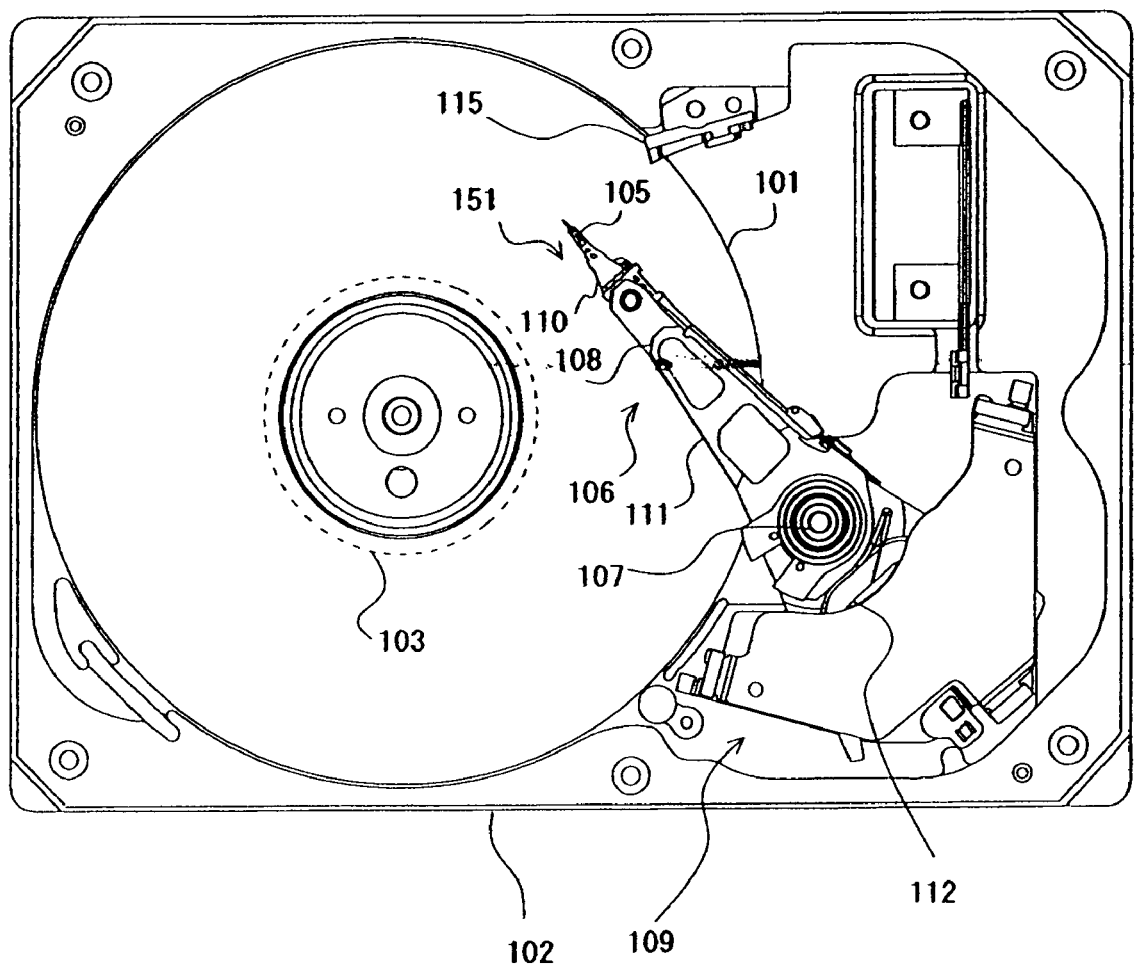
FIG. 1 is a plan view schematically showing the entire configuration of an HDD according to one embodiment.

Embodiments of the present invention relate to a disk drive device and a carriage of an actuator used therein, in particular to an arm structure of the carriage to which a damping member is attached.

An aspect of embodiments of the present invention is a carriage including an arm to which head supporting members is attached and pivoting in a disk drive device. In this carriage, the arm includes two head supporting member attaching surfaces to each of which the head supporting member is attached, a damping member attaching surface which is on the same side as one of the two head supporting member attaching surfaces and is covered by a damping member, and an opposite surface which is an opposite surface to the damping member attaching surface and is exposed. A thickness from a center position between the two head supporting member attaching surfaces to the damping member attaching surface is thinner than a thickness from the center position to the opposite surface. This structure of the arm suppresses performance degradation in the case that a damping member is attached to a single surface of the arm but is not attached to the opposite surface thereof.

The damping member may include a constraining material and a damping material between the damping member attaching surface and the constraining material, and a difference between the thickness from the center position to the damping member attaching surface and the thickness from the center position to the opposite surface is not less than the thickness of the damping member. Thereby, more preferable effects by the asymmetrical arm shape can be expected.

A thickness from the center position to an outer surface of the damping member and the thickness from the center position to the opposite surface may be the same. Thereby, possibility for contacting with the disk can be suppressed. Here, in an example, the damping member is placed in a depression formed on a surface of the arm. This enables the range of designs in the thickness of the arm to be expanded.

If the carriage has a plurality of arms, each of all the arms to which two head supporting members are attached among the plurality of the arms may include two head supporting member attaching surfaces to each of which the head supporting member is attached, a damping member attaching surface which is on the same side as one of the two head supporting member attaching surfaces and is covered by a damping member, and an opposite surface which is an opposite surface to the damping member attaching surface and is exposed, and that a thickness from a center position between the two head supporting member attaching surfaces to the damping member attaching surface is thinner than a thickness from the center position to the opposite surface.

Another aspect of embodiments of the present invention is a disk drive device comprising a plurality of heads for accessing disks and an actuator for supporting the plurality of heads and for moving the heads over the disks by pivoting. The actuator includes a plurality of head supporting members each of which supports the head, an arm for pivoting between two disks and to which two head supporting members corresponding to the two disks respectively are attached, and a damping member placed on a surface of the arm on the same side as one of the two head supporting members. An opposite surface to the damping member placing surface of the arm is not covered by the damping member and is exposed and a thickness from a center position between the two disks to the damping member placing surface is thinner than a thickness from the center position to the opposite surface. This structure of the arm suppresses performance degradation in the case that a damping member is attached to a single surface of the arm but is not attached to the opposite surface thereof.

According to embodiments of the present invention, in the actuator of the disk drive device, performance degradation due to attaching the damping member to a single surface of the arm can be suppressed.

Hereinafter, an embodiment of the present invention is described. For clearness of explanation, the following description and the accompanying drawings contain omissions and simplifications as appropriate. Throughout the drawings, the same components are denoted by like reference numerals, and their repetitive description is omitted if not necessary for the sake of clearness of the explanation. In the present embodiment, a hard disk drive (HDD) is described as an example of the disk drive devices. The HDD according to the present embodiment has a damping member on an actuator which supports and moves head sliders. The damping member is attached to a single surface of the arm. The HDD according to the present embodiment has a feature in an arm mechanism and thereby suppresses the performance degradation caused by that the damping member is attached to a single surface of the arm.

First, an entire configuration of the HDD according to the present embodiment is described with referring to FIG. 1. FIG. 1 is a plan view schematically showing the structure of the HDD 1 of which the top cover is removed. Each component of the HDD 1 is housed in a base 102. The HDD 1 is equipped with a magnetic disk 101 for recording data. The magnetic disk 101 is a non-volatile medium for recording data with a magnetized magnetic layer. A head slider 105 contains a head element portion for reading/writing from and to the magnetic disk 101 with regard to data to be outputted/inputted to and from an external host (not shown) and a slider a surface of which the head element portion is formed on.

An actuator 106 supports and moves the head slider 105. The actuator 106 is supported pivotably about a pivotal axis 107 and driven by a voice coil motor (hereinafter referred to VCM) 109 as a driving mechanism. The assembly of the actuator 106 and the VCM 109 is a moving mechanism of the head slider 105. The actuator 106 is equipped with respective components connected in the longitudinal direction where the head slider 105 is positioned in the order of a suspension 110, an arm 111, and a flat coil 112 from the tip end. A damping member 108 for suppressing vibration of the actuator is attached on the arm 111. The VCM 109 is constituted by the flat coil 112, stator magnets (not shown), and the like. Also, a head gimbal assembly (hereinafter referred to as HGA) 151 is constituted by the suspension 110 and the head slider 105.

The magnetic disk 101 is supported by a spindle motor (hereinafter referred to as SPM) 103 fixed to the base 102 and is rotated by the SPM 103 at a predetermined angular rate. The actuator 106 moves the head slider 105 to above a data region in the surface of the rotating magnetic disk 101 for writing/reading data to and from the magnetic disk 101. Pressure by viscosity of air between an air bearing surface (ABS) of the slider facing to the magnetic disk 101 and the rotating magnetic disk 101 is balanced with pressure applied toward the magnetic disk 101 by the suspension 110, which makes the head slider 105 fly over the magnetic disk 101 with a certain gap. When the magnetic disk 101 is not rotating like that, the actuator 106 retracts the head slider 105 from the data region to a ramp 115. Embodiments of the present invention can be applied to the HDD with contact start and stop (CSS) scheme in which the head slider 105 is retracted to a zone provided around the inner periphery or outer periphery of the magnetic disk 101.

Figure 2A:
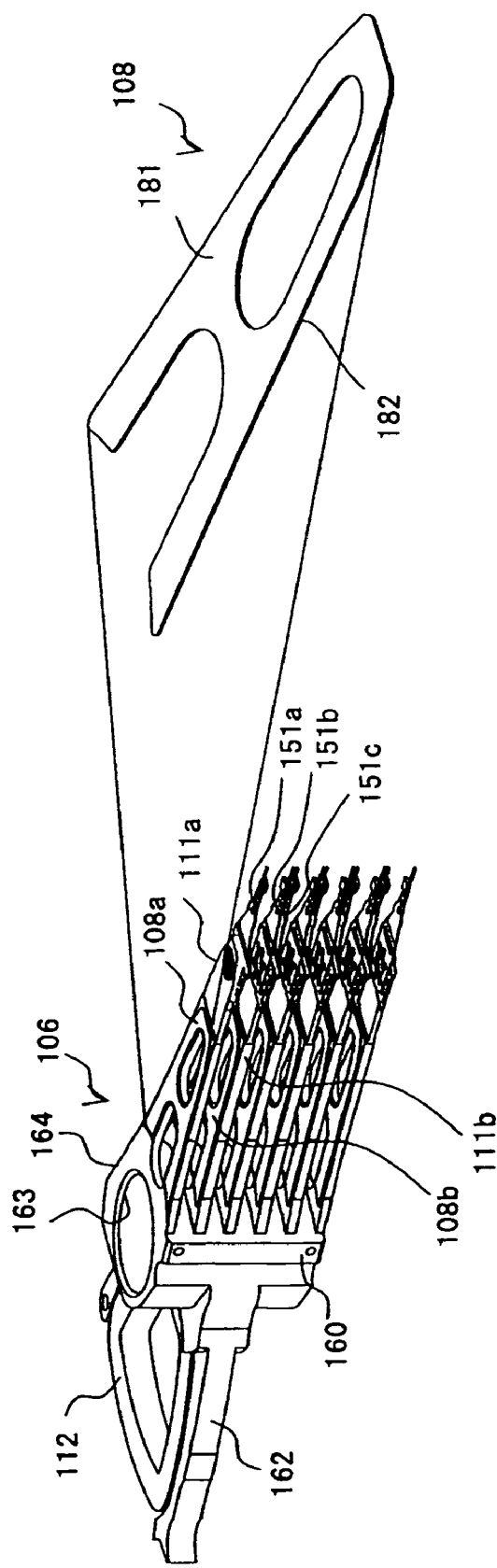
FIGS. 2(a) and 2(b) are diagrams schematically showing the configurations of the actuator and the damping member according to one embodiment.

FIG. 2(a) is a perspective view schematically showing the structure of the actuator 106 according to the present embodiment. The actuator 106 has six arms. Among the six arms, the top-positioned top end arm 111a and the second-positioned inner arm 111b are indicated by reference numerals. Among the six arms, the top and the bottom arms are called as end arms and the other four arms between the end arms are called as inner arms.

The six arms are formed continuously to a pivot support 164. The pivot support 164 has a pivotal axis bore 163 in which the pivotal axis 107 fits. Further, the pivot support 164 has a coil support 162 surrounding and supporting a flat coil 112. The pivot support 164 and the six arms 111 constitute a carriage 160. To the tip ends of the respective arms of the carriage, HGAs are attached. Specifically, to the bottom surface of the top end arm 111a, the HGA 151a is attached. Also, to the top and bottom surfaces of the inner arm 111b, the HGAs 151b and 151c are attached respectively. The HGAs 151 are attached to the arms 111 by means of swaging, or the like.

On the arms 111 according to the present embodiment, damping members 108 for suppressing vibration of the arms are attached. In FIG. 2(a), the damping members 108a and 108b for the top end arm 111a and the second inner arm 111b respectively are exemplified with reference numerals. Commonly used materials are used for the damping members 108a and 108b. The damping members 108a and 108b are made of two materials.

Figure 2B:
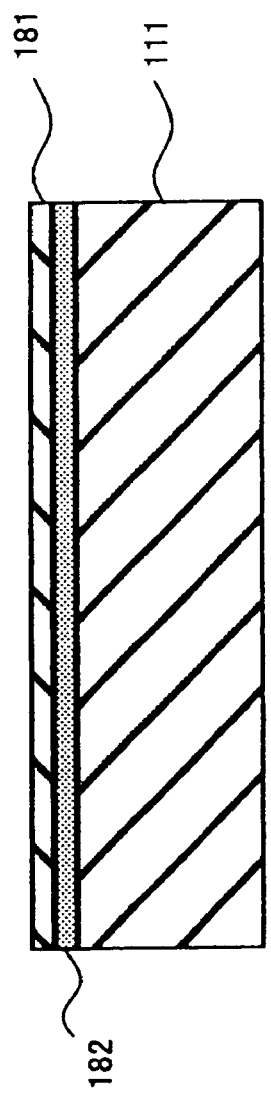

Those are a constraining material 181 and a damping material 182. As shown in FIG. 2(b), the damping material 182 is provided between the constraining material 181 and the arm 111. Typically, the damping material 182 is made of viscoelastic material and the constraining material 181 is made of metal such as stainless alloy. The damping material 182 exerts force by elastic resistance and exerts force proportional to deformation. Frictional resistance between molecules in the deformation absorbs vibration energy to convert it to heat. The arms 111 are formed of aluminum, stainless steel, alloys of these, or the like.

With regard to the actuator 106 according to the present embodiment, a damping member 108 is attached only to a single surface of each arm 111 and the opposite surface is exposed. As well as the vibration by the damping member 108, increase in mass and cost of the arm is suppressed by attaching the damping member. In the example of FIG. 2(a), the damping members 108 are adhered to the top surfaces of the respective arms, but may be adhered to the bottom surfaces of the respective arms.

In the example of FIG. 2(a), the damping member 108 is adhered to cover substantially a whole surface of the arm, but may be adhered to cover a part of the surface and the other part may be left exposed. The damping member 108 is designed so as to absorb the vibration effectively as well as to limit increase in mass. From the point of manufacturing efficiency, the damping members 108 are preferably adhered to the same surfaces (the respective top surfaces or the respective bottom surfaces) of the respective arms 111, but it cannot be denied that the adhering surface or the adhering position are changed according to the arms.

Figures 3A, 3B:
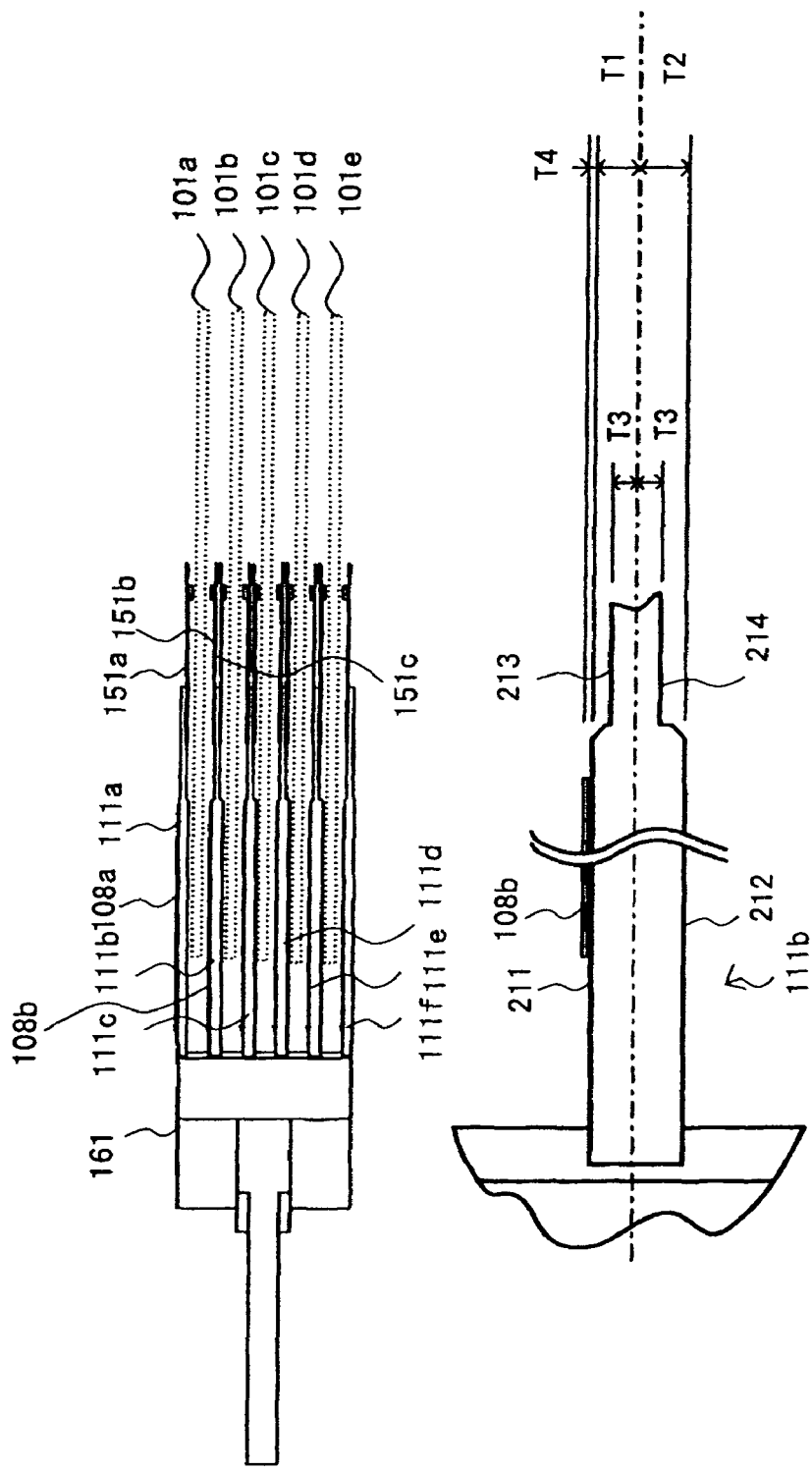
FIGS. 3(a) and 3(b) are diagrams schematically showing the configurations of the actuator and the arm according to one embodiment.

FIG. 3(a) is a side view schematically illustrating the relationship between the actuator 106 and the magnetic disk 101 according to the present embodiment. With regard to the HGA and the damping member, a part of them are indicated exemplarily by reference numerals. The actuator 106 has six arms 111a to 111f and five magnetic disks 101a to 101e exist between the respective arms. To the top end arm 111a and the bottom end arm 111f at the lowest position, only one each of HGA is attached.

To the contrary, two each of HGAs are attached to the inner arms 111b to 111e. The structures of the respective inner arms 111b to 111e are the same. The respective inner arms 111b to 111e are between two magnetic disks when the head sliders 105 are over/under the magnetic disk 101. The respective head sliders 105 of the inner arms 111b to 111e access the under and the top recording surfaces of their adjacent magnetic disks respectively.

FIG. 3(b) is a side view schematically illustrating the structure of the inner arm 111b. The damping member 108 is attached to the top surface 211 of the inner arm 111b. The damping member 108 is not attached to the opposite surface 212 which is exposed. The feature of the inner arm 111b according to the present embodiment is an asymmetric shape with respect to the center between the disks in the pivotal axis direction (the up-down direction of FIG. 3(a)). The structure of the inner arm 111b is specifically described hereinbelow.

The inner arm 111b has HGA attaching surfaces 213 and 214 at the tip end side thereof. The thickness between the HGA attaching surfaces 213 and 214 is thinner than the thickness of the root surfaces 211 and 212 near the pivotal axis 107. The HGA 151b is attached to the upper HGA attaching surface 213, and the HGA 151c is attached to the lower HGA attaching surface 214. The respective head sliders 105 of the HGAs 151b and 151c face the opposite direction of each other.

Step differences are provided between the root surfaces 211 and 212 and the HGA attaching surfaces 213 and 214 respectively. This enables to maintain the clearances between the HGAs 151b and 151c and the magnetic disks 101a and 101b respectively wider. Since the clearance between the HGA 151b and the magnetic disk 101a and the clearance between the HGA 151b and the magnetic disk 101b are required to be the same, the center position between the HGA attaching surfaces 213 and 214 in the direction of the pivotal axis coincide with the center position between the magnetic disks 101a and 101b. In FIG. 3(b), the respective measurements (thicknesses) from the center position between the disks to the HGA attaching surfaces 213 and 214 are denoted by T3.

On the other hand, the measurement (thickness) T1 from the center position between the disks to the root surface 211 and the measurement (thickness) T2 from the center position between the disks to the root surface 212 are different values. The damping member 108b is attached to the root surface 211, which is the damping member attaching surface. In the inner arm structure according to the present embodiment, the thickness T1 from the center position between the disks to the damping member attaching surface 212 is thinner than the thickness T2 from the center position between the disks to the opposite surface, root surface 212.

Attaching the damping member 108b increases the mass and the stiffness of the damping member attaching surface side. Therefore, if the inner arm structure is symmetric with respect to the center position between the disks, the mass and the stiffness of the damping member attaching surface side from the center position is larger than the ones of the opposite side so that the mass and the stiffness of the inner arm 111b gets unbalanced. In the inner arm structure according to the present embodiment, the thickness T1 from the center position between the disks to the damping member attaching surface 211 is smaller than the thickness T2 of the opposite side in order to compensate the change of the mass and the stiffness (at least a part of them) due to the damping member 108b. That is, the inner arm 111b is attached to be shifted to the opposite side of the damping member attaching surface 211. This enables to suppress the unfavorable changes of the vibration mode configuration in the case that the damping member 108 is attached to a single surface only.

Or, if the inner arm structure is symmetric with respect to the center position between the disks, the clearance to the magnetic disk of the damping member side is smaller than the one of the opposite side by attaching the damping member 108. Thereby, the shock absorbing performance is considered to be lowered. The above inner arm structure can reduce the clearance between the outer surface of the damping member 108b (the upper surface in FIG. 3(b)) and the magnetic disk 101a to make the difference between the clearance and the clearance of the opposite surface side smaller. This limits the reduction in the shock absorbing performance.

Here, the difference (T2−T1) between the thickness T1 from the center position between the disks to the damping member attaching surface 211 and the thickness T2 of the opposite side is preferred to be not less than the thickness of the constraining material 181. This is because the increase of the stiffness and the mass of the damping member 108b is mainly caused by the constraining material 181. For example, if the thickness T4 of the damping member 108b is 100 μm and the thicknesses of the constraining material 181 and the damping material 182 are respectively 50 μm, the above-described difference (T2−T1) is preferred to be not less than 50 μm.

Furthermore, the above-described difference (T2−T1) is preferably not more than three times of the thickness of the constraining material 181. If the asymmetry increases more than this, the compensating amount for the damping member 108b becomes too large so that a mode change larger than the one caused by attaching the damping member 108b may occur. For example, if the thickness of the constraining material 181 is 50 μm, the above-described difference (T2−T1) is preferably not more than 150 μm. Especially, when the arm 111 is formed of mainly aluminum and the constraining material 181 of stainless steel (SUS), the difference is preferred to be within the range of these numerical values because the Young's modulus of SUS is 2.7 times of the one of aluminum.

The measurement from the center position between the disks to the outer surface of the damping member 108b is preferably the same as the measurement from the center position between the disks to the opposite surface 212. That is, the difference (T2−T1) is preferably the same as the thickness T4 of the damping member 108b. This is equivalent to that the inner arm 111b is shifted by a half of the thickness T4 of the damping member 108b to the opposite direction of the damping member attaching surface 211. This suppresses the imbalance in the vibration modes. Also, as in the structure shown in FIG. 3(b), in case that a clearance to the magnetic disk 101a is the distance to the outer surface of the damping member 108b, the respective clearances to the magnetic disks 101a and 101b are the same so that the reduction of shock absorbing performance is limited.

With the above-described inner arm structure, the effect can be expected in the respective inner arms. However, in mounting the inner arms to the HDD 1, all of the inner arms 101b to 101e provided on the carriage 160 preferably have the above-described structure. Here, the above-described inner arm structure is effective to the arms positioned between the two magnetic disks. Therefore, even if the carriage 160 has only one arm, when the arm is positioned between the magnetic disks and has two HGAs (head sliders), the arm structure of the present embodiment can be applied. Similarly, if the end arm is between two magnetic disks, the arm structure of the present embodiment can be applied to such an arm. If the carriage 160 has a plurality of arms between the magnetic disks, the above-described arm structure is preferably applied to all of the arms between the disks.

Figure 4A:
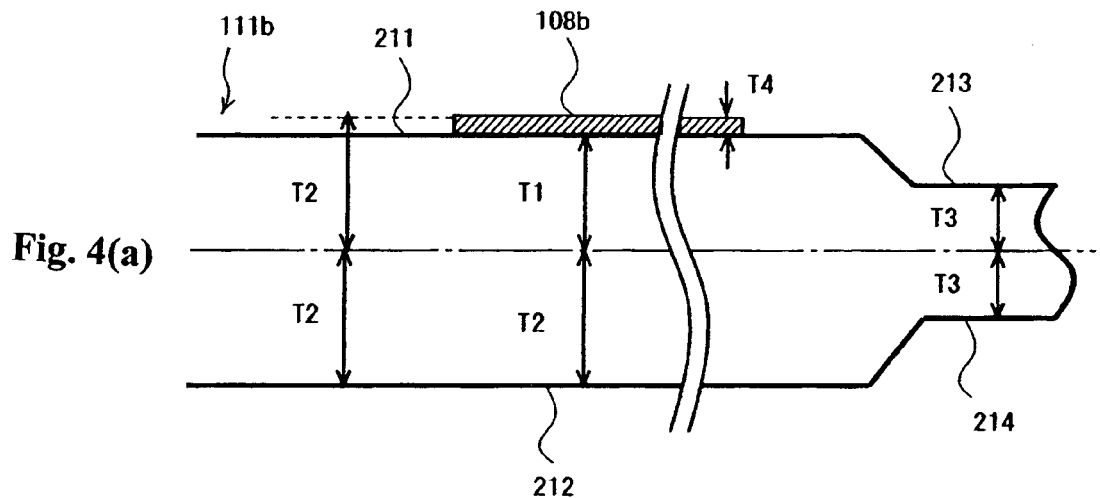
FIGS. 4(a)-4(c) are diagrams schematically showing examples of the configurations of the arm according to one embodiment.
Figure 4B:
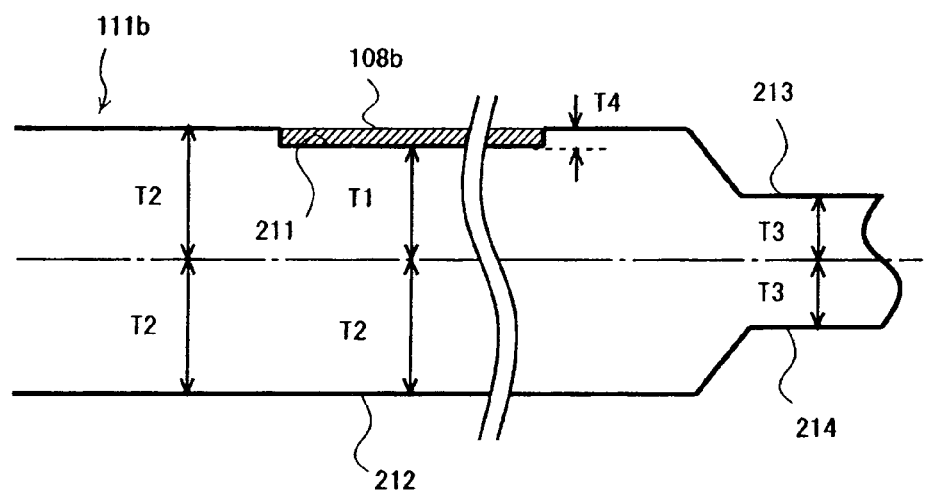
Figure 4C:
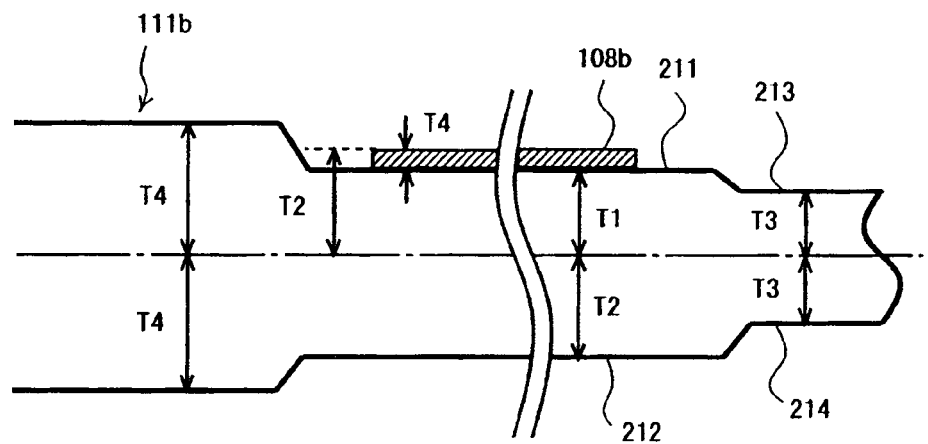

Next, other examples of the preferred arm structures are described with reference to FIGS. 4(a) to 4(c). FIG. 4(a) shows the same arm structure as in the above-described FIG. 3(b) and FIGS. 4(b) and 4(c) illustrate different arm structures from it. As a different point in the arm structure of FIG. 4(b) from the one of FIG. 4(a), a depression is provided on the surface of the arm 111b and the damping member 108b is recessed in the depression.

In the arm structure of FIG. 4(b), the relationship between the thickness T1 from the center position between the disks to the damping member attaching surface 211 and the thickness T2 from the center position between the disks to the opposite surface 212 is the same as the one in the explanation with referring to FIG. 3(b). As illustrated in FIG. 4(b), the bottom plane of the depression is the damping member attaching surface 211. In the example of FIG. 4(*b*), the depth of the depression (the difference between T1 and T2) is the same as the thickness T4 of the damping member 108*b*. Even if the depth of the depression is smaller than the thickness T4, the effect by the arm structure of the present embodiment can be attained.

Thus, forming the depression on the surface of the arm 111*b* and adhering the damping member 108*b* thereto makes adjustment of the entire thickness 2×T2 of the arm 111*b* easier to expand the range of designs. Further, setting the depth of the depression to not less than the thickness T4 of the damping member 108*b* prevents decrease of the clearance to the magnetic disk. Especially, when the damping member 108*b* is small and the exposed area in the surface of the arm 111*b* is large, this form is effective.

In FIG. 4(*c*), like in FIG. 4(*b*), the damping member 108*b* is adhered in the depression on the surface of the arm 111*b*. In the arm structure of FIG. 4(*c*), the relationship between the thickness T1 from the center position between the disks to the damping member attaching surface 211 and the thickness T2 from the center position between the disks to the opposite surface 212 is the same as the one in the explanation with referring to FIG. 3(*b*). Besides, FIG. 4(*c*) illustrates an example in which the thickness T4 of the damping member 108*b* is the same as the difference between T1 and T2. In the arm structure of FIG. 4(*c*), the thickness decreases stepwise from the pivotal axis 107 toward the HGA 151. With regard to the thickness from the center position between the disks, the relationship of T4>T2>T1>T3 is satisfied.

Figure 5A:
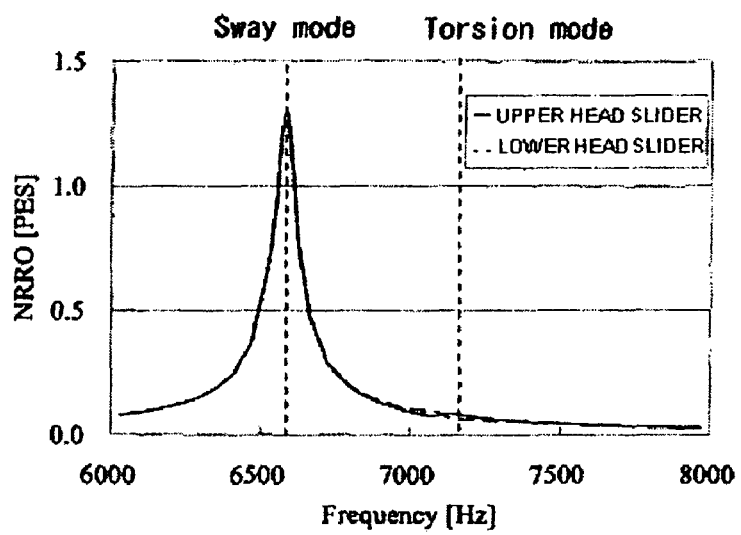
FIGS. 5(a)-5(c) indicate the results of the numerical analysis showing the changes of vibration between the conventional arm structure and the arm structure of the present example, according to one embodiment.
Figure 5B:
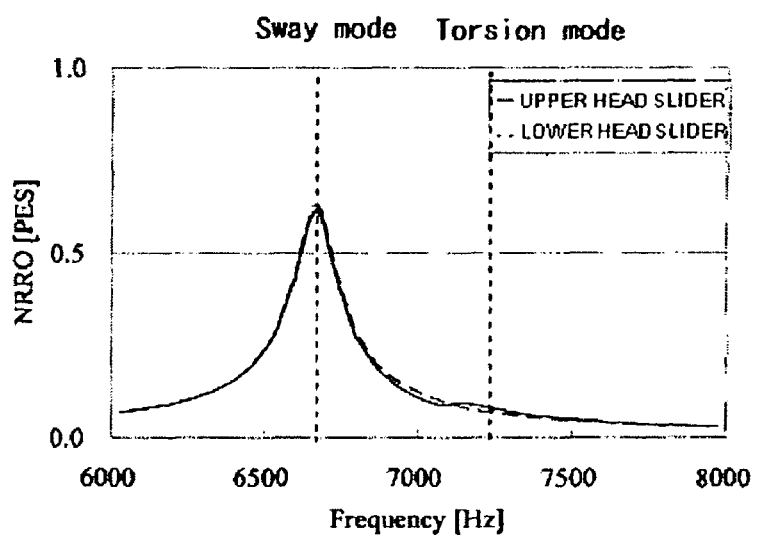
Figure 5C:
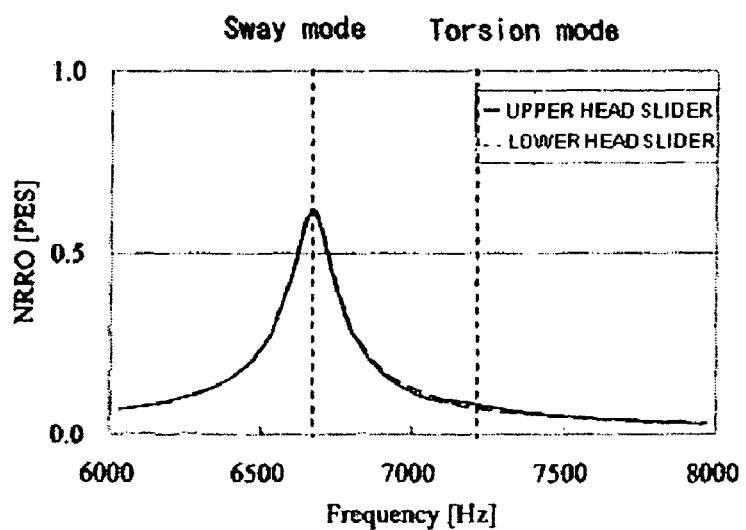

In order to prove effects of the inner arm structure of embodiments of the present invention, frequency responses are obtained by a numerical analysis simulation. Hereinbelow, the result of the analysis is explained. FIG. 5(*a*) indicates amplitudes of the head slider in the off-track direction in case that the cyclic excitation force in the in-plane direction is applied to the tip end of the conventional symmetrical shaped inner arm without the damping member adhered. FIG. 5(*b*) indicates amplitudes of the head slider in the off-track direction in case that the same force is applied to the tip end of the conventional symmetrical shaped inner arm with the damping member adhered to the single surface thereof. The structure of FIG. 5(*b*) corresponds to the one of FIG. 8. FIG. 5(*c*) indicates amplitudes of the head slider in the off-track direction in case that the same force is applied to the tip end of the asymmetrical shaped inner arm according to the present embodiment with the damping member adhered to the single surface thereof. The structure of FIG. 5(*c*) corresponds to the one of FIG. 3.

As vibrations of the arms (head sliders), sway mode which is vibration in the in-plane direction of the magnetic disk and torsion mode in which the arm vibrates like twisting exist other than bending mode which is vibration in the normal line direction of the magnetic disk. The solid line represents vibration of the upper head slider, and the dotted line, of the lower head slider. Also, in the outputs, the peak value of the outputs before the damping member is adhered is set to coincide with the actual value.

Figure 9A:
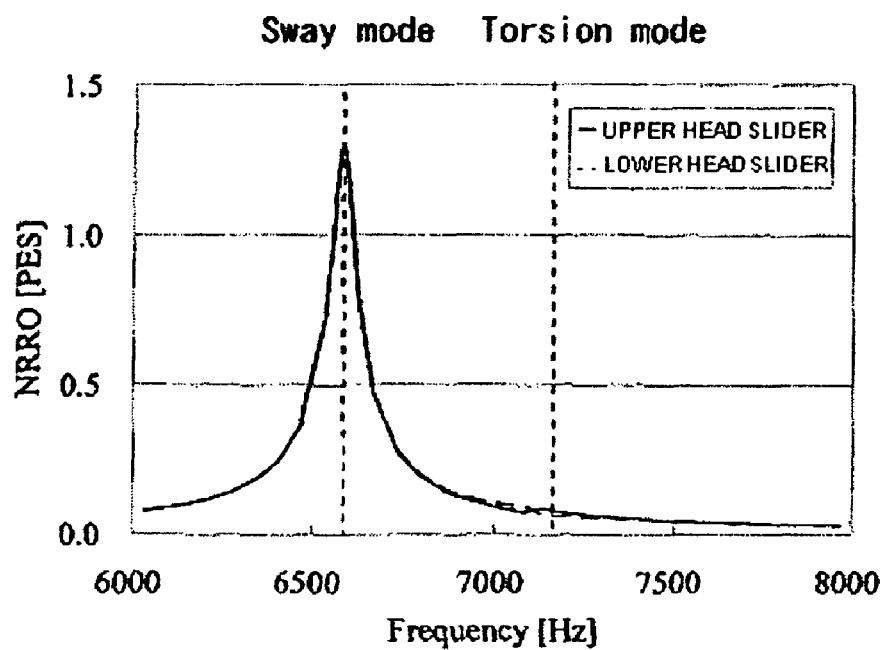
FIGS. 9(a) and 9(b) indicate the results of the numerical analysis showing the changes of vibration between the arms with damping member and without damping member according to a conventional technique.
Figure 9B:
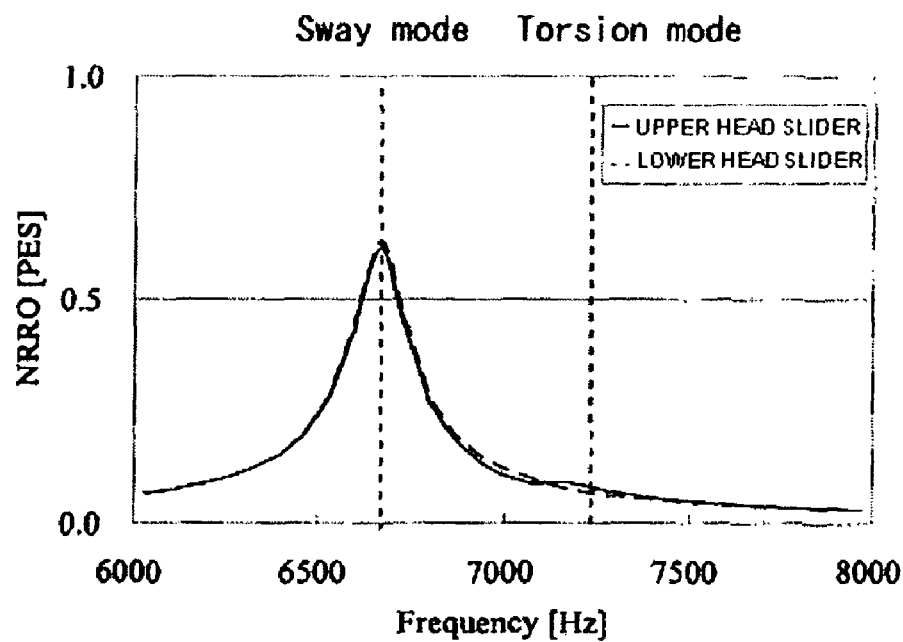

FIGS. 5(*a*) and 5(*b*) are similar graphs as FIGS. 9(*a*) and 9(*b*) according to the conventional technique and the explanation about the relationship between them is omitted. Comparing FIG. 5(*c*) with FIG. 5(*a*), the vibration in the sway mode is much reduced. This is considered to be caused by the vibration suppressing effect by the damping member. Comparing FIG. 5(*c*) with FIG. 5(*b*), it is understood that the difference between the peak values with the upper and the lower head sliders has been improved in the arm structure of the present embodiment (FIG. 5(*c*)).

Figure 6A:
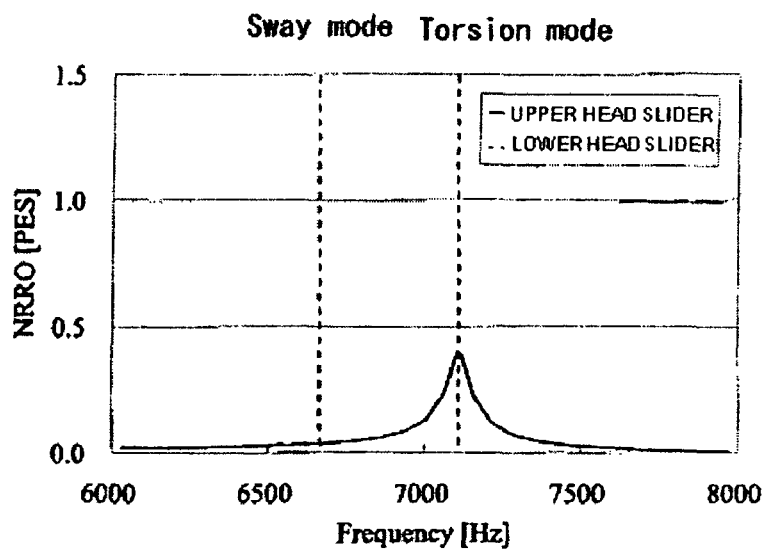
FIGS. 6(a)-6(c) indicate the results of the numerical analysis showing the changes of vibration between the conventional arm structure and the arm structure of the present example, according to one embodiment.
Figure 6B:
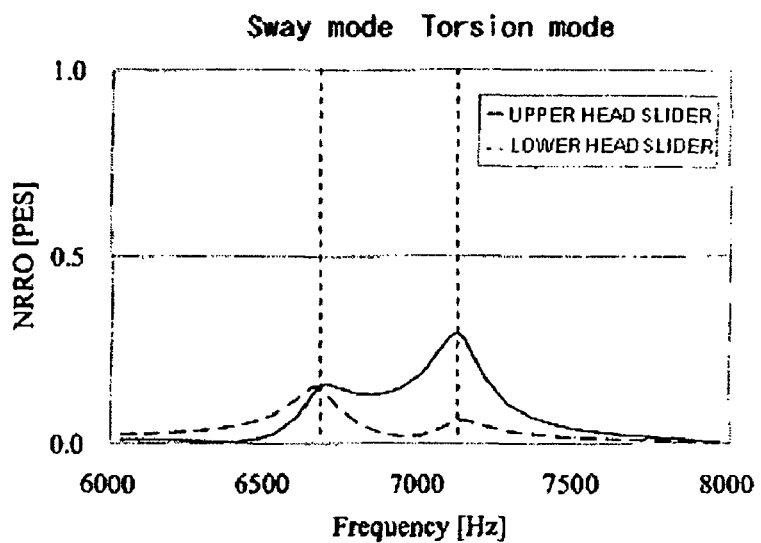
Figure 6C:
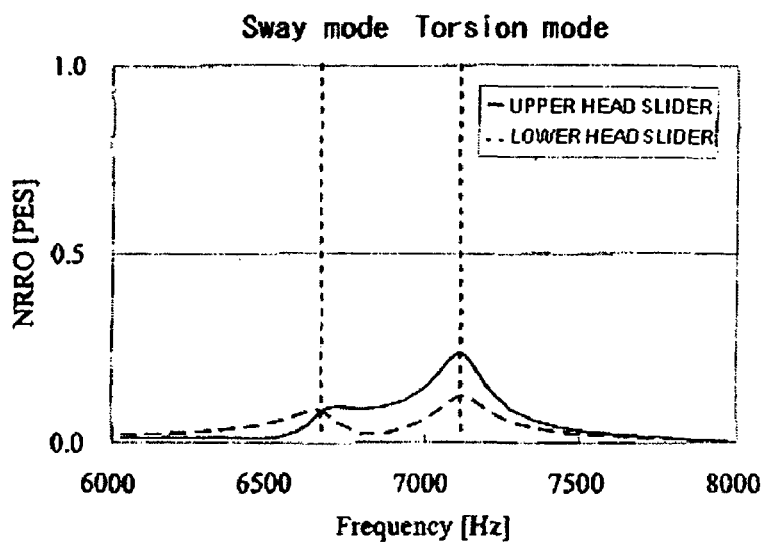
Figure 10A:
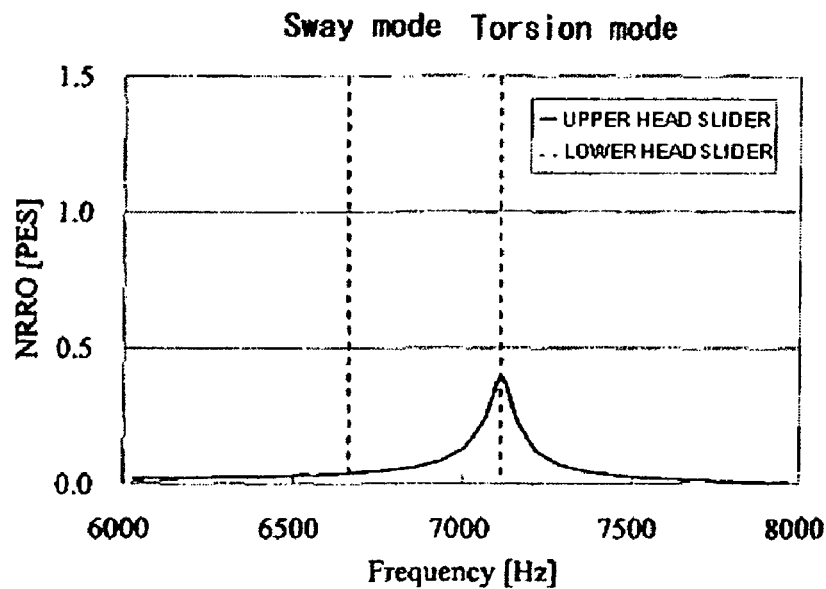
FIGS. 10(a) and 10(b) indicate the results of the numerical analysis showing the changes of vibration between the arms with damping member and without damping member according to a conventional technique.
Figure 10B:
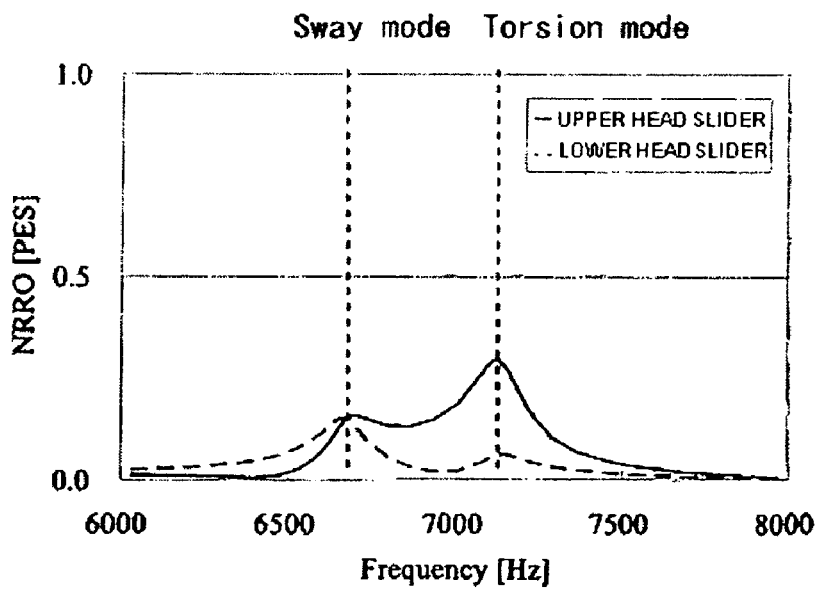

Next, the result of the analysis of the amplitudes in the off-track direction of the head sliders in case that a torsion moment about the longitudinal direction of the arm as the axis is applied to the tip end of the inner arm is indicated. FIG. 6(*a*) indicates the result of the analysis with the conventional symmetrical shaped inner arm without the damping member adhered. FIG. 6(*b*) indicates the result of the analysis with the conventional symmetrical shaped inner arm the single surface to which the damping member is adhered. FIG. 6(*c*) indicates the result of the analysis of the asymmetrical shaped inner arm according to the present embodiment, on the single surface of which the damping member is adhered. FIG. 6(*b*) corresponds to the structure of FIG. 8, and FIG. 6(*c*), of FIG. 3. FIGS. 6(*a*) and 6(*b*) are the same graphs as FIGS. 10(*a*) and 10(*b*) according to the conventional technique, and therefore the explanation about the relationship between them is omitted.

Comparing FIG. 6(*c*) with FIG. 6(*a*), it is realized that the vibration is significantly changed by adhering the damping member in case that the torsion moment is applied. A peak of the sway mode appears in response to the torsion moment as well. It is also realized that a difference between the vibration of the upper and lower head sliders appears in the torsion mode. However, comparing FIG. 6(*c*) with FIG. 6(*b*), the peak value to the torsion moment which appeared in the sway mode gets smaller. In addition to the decrease of the peak value in the torsion mode, the difference between the upper and lower head becomes smaller.

Figure 7A:
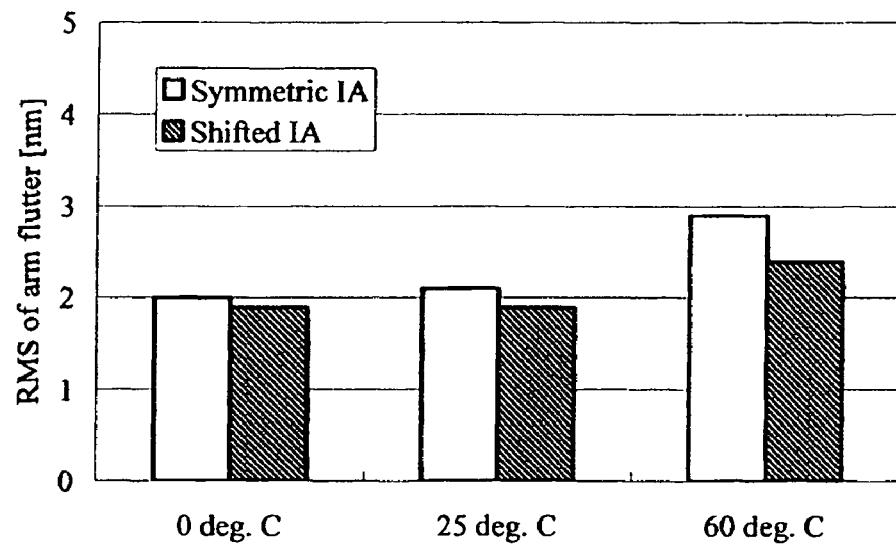
FIGS. 7(a) and 7(b) indicate the results of the measurements showing the changes of vibration between the conventional arm structure and the arm structure of the present example, according to one embodiment.
Figure 7B:
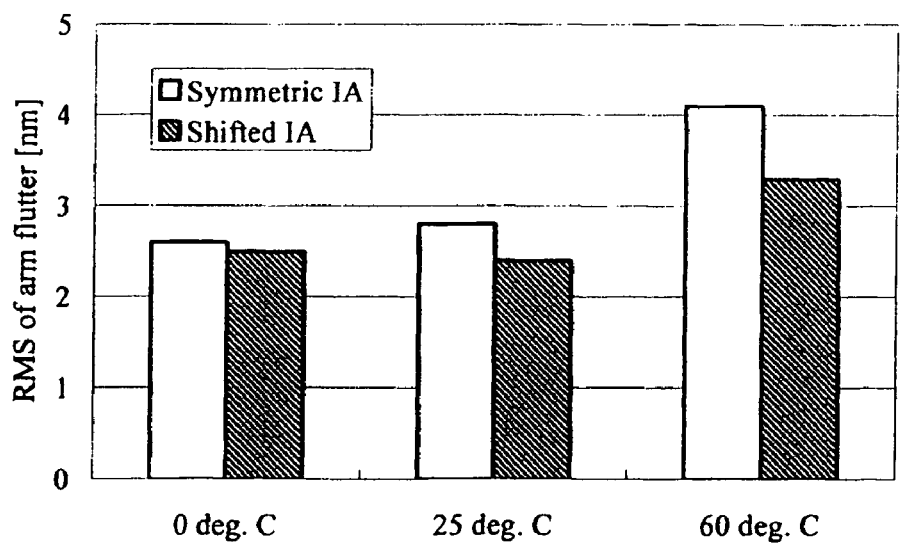

To confirm the effectiveness of the suggested technique, an experiment is carried out using an actual HSA. The result thereof is described hereinbelow. FIGS. 7(*a*) and 7(*b*) indicate the results of measuring arm flutters. FIG. 7(*a*) is a graph showing the maximum values with all of the heads and FIG. 7(*b*) is a graph showing the averaged values with all of the heads. The Y-axis represents the root means square (RMS) values of the flutters and the values are measured at three different temperatures. As seen from FIGS. 7(*a*) and 7(*b*), it is revealed that the arm flutters in the asymmetrical shifted arm structure (Shifted Arm) of the present embodiment decrease more than ones in the symmetrical arm structure (Symmetrical IA).

As set forth above, the present invention is described by way of particular embodiments but is not limited to the above embodiments. A person skilled in the art can easily modify, add, and convert the each element in the above embodiments within the scope of the present invention. For example, the present invention is useful especially to the HDDs but may be applied to other types of disk drive devices.

What is claimed is:

1. A carriage comprising an arm to which head supporting members is attached and pivoting in a disk drive device; wherein the arm comprises:

two head supporting member attaching surfaces to each of which the head supporting member is attached, a dampening member attaching surface which is on the same side as one of the two head supporting member attaching surfaces and is covered by a dampening member, and an opposite surface which is opposite to the damping member attaching surface and is exposed; and a thickness from a center position between the two head supporting member attaching surfaces to the damping member attaching surface is thinner than a thickness from the center position to the opposite surface, wherein
the carriage include a plurality of arms;
each of all the arms to which two head supporting members are attached among the plurality of arms comprises:
two head supporting member attaching surfaces to each of which the head supporting member is attached,
a damping member attaching surface which is on the same side as one of the two head supporting member attaching surfaces and is covered by a damping member, and
an opposite surface which is an opposite surface to the damping member attaching surface and is exposed; and
a thickness from a center position between the two head supporting member attaching surfaces to the damping member attaching surface is thinner than a thickness from the center position to the opposite surface.

2. The carriage according to claim 1, wherein
the damping member includes a constraining material and a damping material between the damping member attaching surface and the constraining material; and
a difference between the thickness from the center position to the damping member attaching surface and the thickness from the center position to the opposite surface is not less than the thickness of the damping member.

3. The carriage according to claim 1, wherein a thickness from the center position to an outer surface of the damping member and the thickness from the center position to the opposite surface is the same.

4. The carriage according to claim 1, wherein the damping member is placed in a depression formed on a surface of the arm.

5. A disk drive device comprising:
a plurality of heads for accessing disks; and
an actuator for supporting the plurality of heads and for moving the heads over the disks by pivoting, and comprising:
a plurality of head supporting members each of which supports the head,
an arm for pivoting between two disks and to which two head supporting members corresponding to the two disks respectively are attached, and
a damping member placed on a surface of the arm on the same side as one of the two head supporting members;
wherein
an opposite surface to the damping member placing surface of the arm is not covered by the damping member and is exposed; and
a thickness from a center position between the two disks to the damping member placing surface is thinner than a thickness from the center position to the opposite surface,
wherein
the actuator includes a plurality of arms;
each of all the arms to which two head supporting members are attached among the plurality of the arms comprises:
two head supporting member attaching surfaces to each of which the head supporting member is attached,
a damping member attaching surface which is on the same side as one of the two head supporting member attaching surfaces and is covered by a damping member, and
an opposite surface which is opposite to the damping member attaching surface and is exposed; and
a thickness from a center position between the two head supporting member attaching surfaces to the damping member attaching surface is thinner than a thickness from the center position to the opposite surface.

6. The disk drive device according to claim 5, wherein
the damping member includes a constraining material and a damping material between the damping member attaching surface and the constraining material; and
a difference between the thickness from the center position to the damping member attaching surface and the thickness from the center position to the opposite surface is not less than the thickness of the damping member.

7. The disk drive device according to claim 5, wherein a thickness from the center position to an outer surface of the damping member and the thickness from the center position to the opposite surface is the same.

8. The disk drive device according to claim 5, wherein the damping member is placed in a depression formed on a surface of the arm.

* * * * *